United States Patent [19]
Lacon

[11] 3,939,022
[45] Feb. 17, 1976

[54] METHOD OF FORMING ARTICLES OF FIBROUS MATERIALS

[75] Inventor: John W. Lacon, Sarnia, Canada

[73] Assignee: Fiberglas Canada Limited, Toronto, Canada

[22] Filed: May 22, 1974

[21] Appl. No.: 472,260

Related U.S. Application Data

[62] Division of Ser. No. 346,381, March 30, 1973, Pat. No. 3,912,572.

[30] Foreign Application Priority Data

Feb. 1, 1973 Canada .............................. 162625

[52] U.S. Cl. ................. 156/200; 156/271; 264/257
[51] Int. Cl.$^2$ ......................................... B31F 1/00
[58] Field of Search ......... 156/62.2, 62.6, 441, 201, 156/202, 200, 443, 218, 215, 269, 271, 381; 264/258, 257; 425/82, 83, 397

[56] References Cited
UNITED STATES PATENTS

| | | | |
|---|---|---|---|
| 2,906,317 | 9/1959 | Keyes | 156/62.6 |
| 2,997,096 | 8/1961 | Morrison et al. | 156/381 X |
| 3,050,106 | 8/1962 | Dusch et al. | 156/451 |
| 3,093,532 | 6/1963 | Miller et al. | 264/258 X |
| 3,147,165 | 9/1964 | Slatter | 156/62.2 |
| 3,150,025 | 9/1964 | Slatter et al. | 425/83 X |
| 3,497,413 | 2/1970 | Ullman et al. | 156/425 |
| 3,583,030 | 6/1971 | Terry et al. | 425/328 |
| 3,819,435 | 6/1974 | Roberts et al. | 425/83 X |

Primary Examiner—William A. Powell
Assistant Examiner—David A. Simmons
Attorney, Agent, or Firm—Sughrue, Rothwell, Mion, Zinn & Macpeak

[57] ABSTRACT

A method for the continuous formation of articles, e.g. one piece pipe insulator sections, from a strip-shaped felt of fibrous material, e.g. glass fibre, containing a hardenable bonding material employs stationary forming surfaces between which the strip is pulled, from beyond the forming surfaces, to deform the strip, which is then cured. The forming surfaces are readily and inexpensively replaceable for forming articles of various shapes and/or sizes.

23 Claims, 18 Drawing Figures

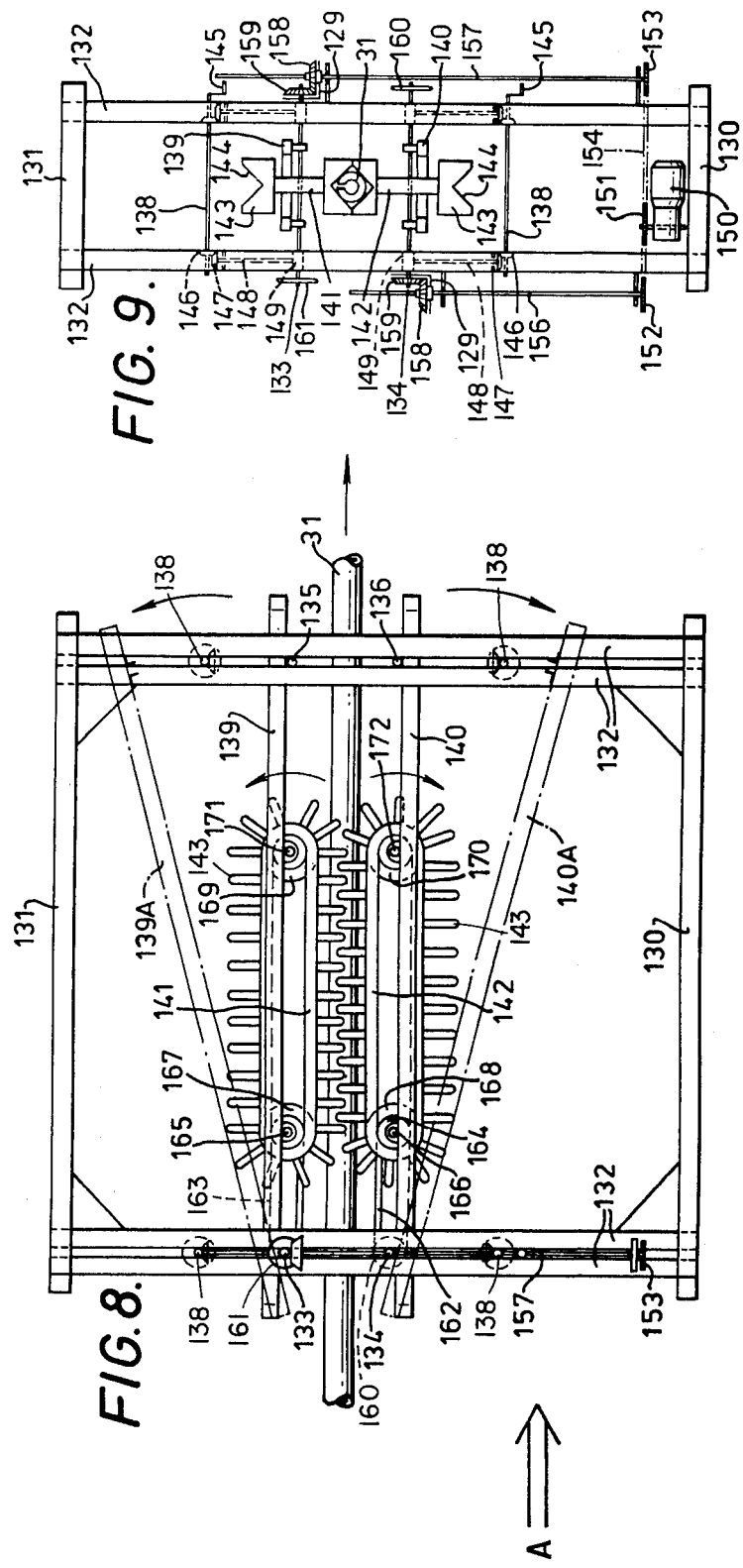

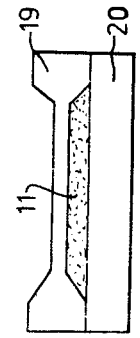
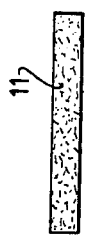
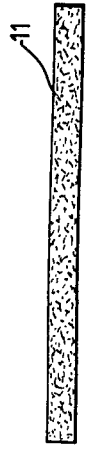
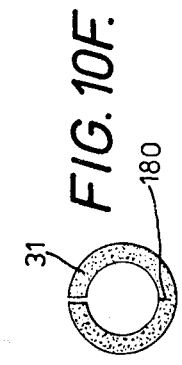
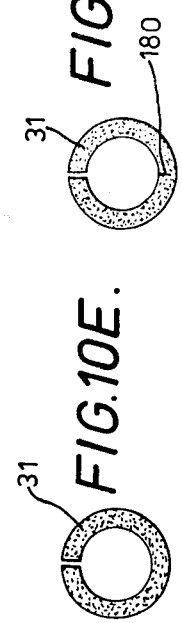
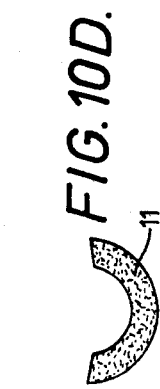
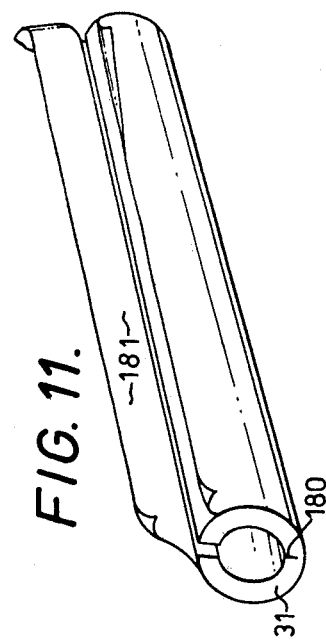
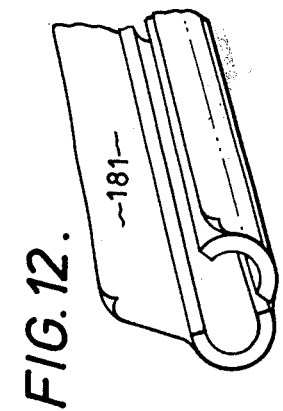

METHOD OF FORMING ARTICLES OF FIBROUS MATERIALS

This is a division of application Ser. No. 346,381, filed Mar. 30, 1973, now U.S. Pat. No. 3,912,572.

The present invention relates to methods of and apparatus for forming articles from strip-shaped felts of fibrous material, for example glass fibre insulating wool, containing a hardenable bonding material, e.g. an uncured thermo-setting bonding material.

One important application of the present invention is to the manufacture of longitudinally split cylindrical thermal insulation coverings for hot and cold pipes, which coverings are commonly referred to as "one piece pipe insulator sections" and are kerfed opposite their slots to enable them to be opened sufficiently wide to be fitted over a pipe, after which they snap into a closed condition around the pipe when released.

However, the invention is not restricted to the manufacture of one piece pipe insulator sections, and may with advantage be employed for making other articles, for example of rectangular, segmental, arcuate or irregular cross-section, from felts of fibrous material.

Uncured glass fibre wool in the condition in which it is normally delivered to apparatus for forming it into pipe insulator sections has a low bulk density and a non-uniformly low strength under tension and, due to tackiness caused by its hardenable bonding material, usually an uncured resin, causes considerable friction when moved in sliding contact over a surface. Consequently, the feeding of a strip-shaped felt of uncured glass fibre wool under tension through processing apparatus for forming articles therefrom can present serious difficulties in avoiding breakage of the felt.

DESCRIPTION OF THE PRIOR ART

It has previously been proposed to form one piece pipe insulator sections from such felt by winding the felt around a mandrel and curing the felt while the felt remains wound on the mandrel. The mandrel may be smooth or may be perforated to allow hot gases to be fed radially through the mandrel and the felt for curing the felt. However, if the wound felt is caused to slide along the mandrel while the latter remains stationary, there is considerable friction between the felt and the mandrel, particularly if a perforated mandrel is employed, and this friction is increased as wool and resin detritus tend to accumulate on the mandrel. To partially overcome this difficulty, the mandrel may be moved longitudinally together with the felt wound thereon. In either case, however, careful and technically difficult control is required of the angle at which the felt is fed onto the mandrel. This angle, and the width of the felt, depend on the diameter and thickness of the tubular insulation being produced. Consequently, variations in the outer diameter of the wound felt are produced by variations in the overlap of successive convolutions of the felt on the mandrel, and these outer diameter variations are at best unsightly and at worst unacceptable when two or more pipe insulator sections are required to fit closely over one another around a pipe. These variations may be overcome by the use of shaping tools for shaping the outer diameter of the wound felt, as disclosed for example in Canadian Pat. No. 897,941, which teaches the use of frusto-conical rollers rotating on the outer surface of the wound felt, but the use of such shaping tools increases the mechanical complexity of the apparatus and the drag on the felt.

Canadian Pat. No. 570,945 discloses a method in which the felt wound on the mandrel is encased in a pair of perforated mold members, and the encased assembly, including the mandrel, is then advanced through a curing zone. This method has the disadvantage that the rate of production of the insulation is limited by the need to repeatedly fit the perforated mold members around the wound felt, and by the limited size of a roll of the felt which can be rotated around the mandrel for winding the felt on the mandrel.

Moreover, the above-described prior methods employing an advancing mandrel have the further important disadvantages that the rate of production is slowed by the necessity for repeatedly fitting new mandrel sections to the end of the mandrel, and also that they require considerable capital investment in equipment, and in particular in mandrels and mold members of different diameter in order to be able to produce insulation of various diameters. In this connection, it is pointed out that the production of a range of different insulation diameters is important in practice to provide insulation sizes which can fit different pipe diameters and which can be fitted in nesting relationship over one another around a pipe.

In Canadian Pat. No. 713,014 there is disclosed an apparatus for the continuous production of tubular insulation by feeding the felt onto an endless wire mesh belt. A series of separate mandrels carried on an endless chain above the belt move in succession into contact with the felt, which is then wrapped, with the belt, around the successive mandrels by a shoe-horn former. The wrapped belt and felt then advance with the mandrels through a baking tube for curing the felt to form a longitudinally split tube. This prior arrangement has the disadvantage that a plurality of identical mandrels are required for each required different internal diameter of the insulators, and a different width of wire mesh belt is required for each required different external diameter, and consequently considerable capital investment in equipment is necessary. In addition, replacement of the mandrels, their endless chain and the wire mesh belt each time the apparatus is changed over to the production of a different size of insulator is time consuming and expensive. Also, gaps between the mandrels wrapped by the felt produce corresponding irregularities on the internal surfaces of the insulators.

U.S. Pat. No. 3,661,491, issued May 9, 1972, discloses apparatus for consolidating, shaping and fixing a loose mass of fibres which employs a pair of stationary, spaced-apart heated platens. The mass of fibres is fed between smooth opposed surfaces of the platens to compress the mass and to heat cure a heat activable binder in the fibre mass. The fibre mass is fed on an endless conveyor to the platens and, to facilitate the compression of the fibre mass by the platens, the latter are formed with tapered portions forming an inlet which converges in the direction of travel of the fibre mass between the platens. However, in practice, this prior arrangement will have the disadvantage that the heating of the binder as the fibre mass slides between the stationary heated platen surfaces will be sufficient to cure the binder only to a limited depth across the thickness of the compressed fibre mass. Moreover, the fibre mass will tend to bunch at the inlet, since the compression of the fibre mass by the tapered portions of the platens will result in a high degree of friction between the fibres and the surfaces of the platens, particularly since the fibre mass contains uncured binder.

As the conveyor continues to feed more of the fibre mass to the inlet, the bunching of the fibre mass at the inlet will result in jamming of the fibre mass and prevent travel of the fibre mass between the heated platens and the bunched-up fibre mass will be partially cured by the platens in a shape which will not fit between the platens.

OBJECTS OF THE INVENTION

It is accordingly an object of the present invention to provide a novel and improved method of and apparatus for the continuous formation of articles from an uncured strip-shaped felt of fibrous material, which method and apparatus facilitate change-over to the production of articles of different cross-sections and enable the continuous production of such articles with regular surfaces.

According to one aspect of the present invention, a method of forming articles from a strip-shaped felt of fibrous material containing hardenable bonding material comprises the steps of pulling the felt between stationary forming surfaces which deform the cross-sectional shape of the felt by sliding contact with opposite sides of the felt, curing the bonding material while the felt is in its deformed shape, and subsequently cutting the deformed felt into separate lengths, the pulling of the felt being effected from beyond the stationary forming surfaces.

According to another aspect of the present invention, apparatus for forming articles from a strip-shaped felt of fibrous material containing a hardenable bonding material comprises stationary forming surfaces spaced apart for sliding contact with opposite sides of the felt and shaped to deform the cross-section of the felt, a felt feed mechanism disposed beyond the forming surfaces and adapted to pull the felt between the forming surfaces, means for curing the felt while the felt is in its deformed shape, and a cutter for cutting the deformed felt into separate lengths.

Since stationary forming surfaces are employed, it is possible to construct the apparatus so that the parts of the apparatus on which these surfaces are provided can be readily removed and replaced to adapt the apparatus for the production of articles of different cross-sections. It has been found that by pulling the cured felt from beyond these surfaces, the travel of the felt between these surfaces is considerably facilitated since the tension in the felt causes the felt to contract trasversely of the felt, which reduces the friction between the felt and the stationary forming surfaces. Thereby, the risk of breakage of the felt due to the low tensile strength and tackiness of the uncured felt can be counteracted. Such risk may be further reduced by curing the bonding material at and near the surfaces of the felt before the felt reaches the forming surfaces, and by passing one or more reinforcement cords or other tensile members with the felt between the forming surfaces.

The invention will be more readily understood from the following description of an embodiment thereof given by way of example with reference to the accompanying drawings, in which:

FIG. 8 shows a side view of a gripper mechanism forming part of the apparatus of FIGS. 1A and 1B;

FIG. 9 shows an end view of the gripper mechanism taken in the direction of arrow A in FIG. 8;

FIGS. 10A to 10F show views taken in transverse cross-section through a mineral wool felt during successive stages of the formation of the felt into a pipe insulation section;

FIG. 11 shows a view in perspective of a one-piece pipe insulation section formed by the apparatus of FIGS. 1A and 1B; and FIG. 12 shows a broken-away view in perspective of part of the insulation section of FIG. 11 in an opened condition.

Figure 1A:
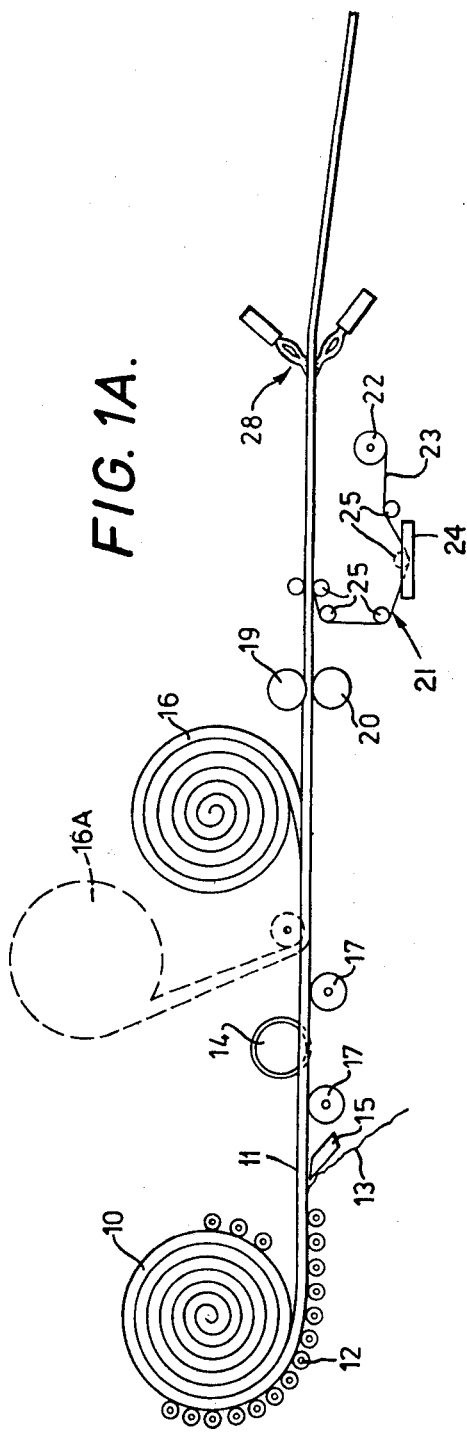
FIGS. 1A and 1B show a diagrammatic side view of an apparatus for forming one-piece pipe insulation sections.
Figure 1B:
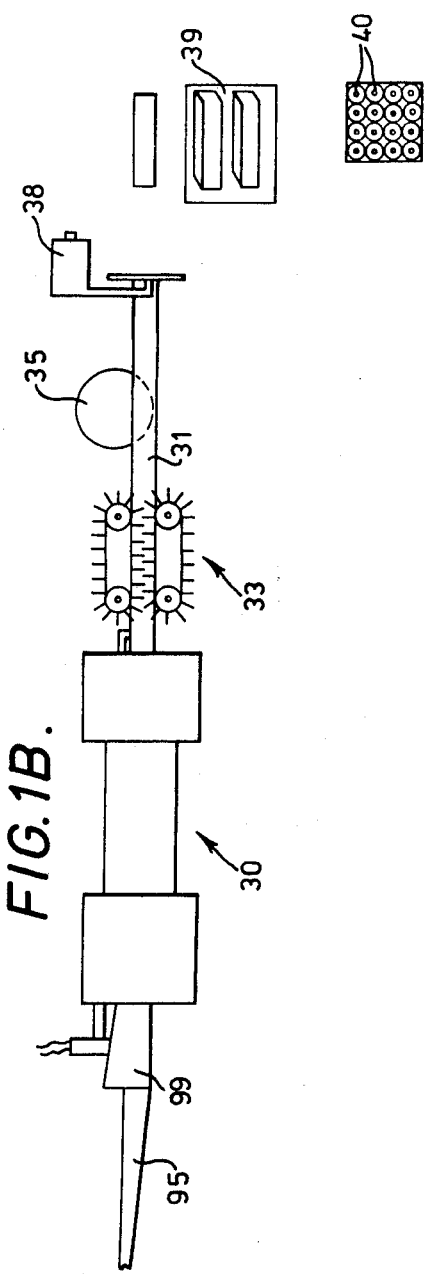

The apparatus shown in FIGS. 1A and 1B is intended primarily for the continuous production of longitudinally split cylindrical one-piece pipe insulation sections from uncured mineral wool felt containing a hardenable bonding material in the form, for example, of an uncured resin. However, as will be described later in greater detail, this apparatus can readily be adapted for the formation of articles of various cross-sections from the same or different material.

At the left hand end of the apparatus, as viewed in FIG. 1A, a supply coil, indicated generally by reference numeral 10, of uncured strip-shaped mineral wool felt 11 is supported on a plurality of freely rotatable support rollers 12.

Since the felt 11 in the supply coil 10 contains an uncured resin, a strip of paper 13 is interleaved between the layers of the supply coil 10 to prevent these layers from adhering to one another. A stripper 15 is provided after the rollers 12 for stripping the paper 13 from the underside of the felt 11.

Forwardly of the supply coil 10, in the direction of advance of the felt 11 during operation of the apparatus, the apparatus includes a plurality of successive felt treatment sections at which the felt is subjected to successive treatments to convert the felt into longitudinally split cylindrical pipe insulation sections during its travel.

The first of these sections is provided with a circular cutter 14 which may be one of a pair of co-axial cutters, the periphery of which extends into the path of the felt 11 and which serves to cut the felt 11 longitudinally to the width required to form the insulation sections. While being cut by the cutter 14, the felt 11 is supported on support rollers 17, which are freely rotatable about horizontal axes. Superfluous felt is wound onto a take-up coil 16. The take-up coil may be moved to the position 16A, shown in broken lines in FIG. 1A, for use, for example, when the supply coil 10 has been exhausted.

The next section of the apparatus is a compaction section at which rollers 19, 20 are provided at opposite sides of the path of the felt 10.

The compaction section is followed by a reinforcement feed section, indicated generally by reference numeral 21, at which there is provided a supply reel 22 for a reinforcement cord 23, a bath container 24 and guide rollers 25 for guiding the reinforcement cord 23 from the supply reel 22 through the bath container 24 to the felt 11.

The next section of the apparatus is a crisping section, indicated generally by reference numeral 28, which serves to crisp the surface of the felt 11, as described in more detail below.

The crisping section 28 is followed by a forming section indicated generally by reference numeral 30. In the forming section 30, the felt 11 is deformed so that its cross-section changes from a rectangular cross-section to an annular cross-section, and the felt 11 is thereby converted into a longitudinally split cylindrical tube passing from the exit end of the forming section 30. This tube has been indicated by reference numeral 31 in FIG. 1B.

The tube 31 passes from the forming section 30 to a gripper mechanism 33, which pulls the tube 31 from the forming section 30.

Following the gripper mechanism 33, there is provided a cutter disc 35, the purpose of which is to cut a longitudinal kerf in the tube 31, as described in great detail below. The tube 31 then passes to a transverse cutter 38, by which the tube 31 is cut transversely into separate sections of required length, which are collected and passed through an automatic wrapping machine 39 to an automatic boxing machine 40.

Figure 2:
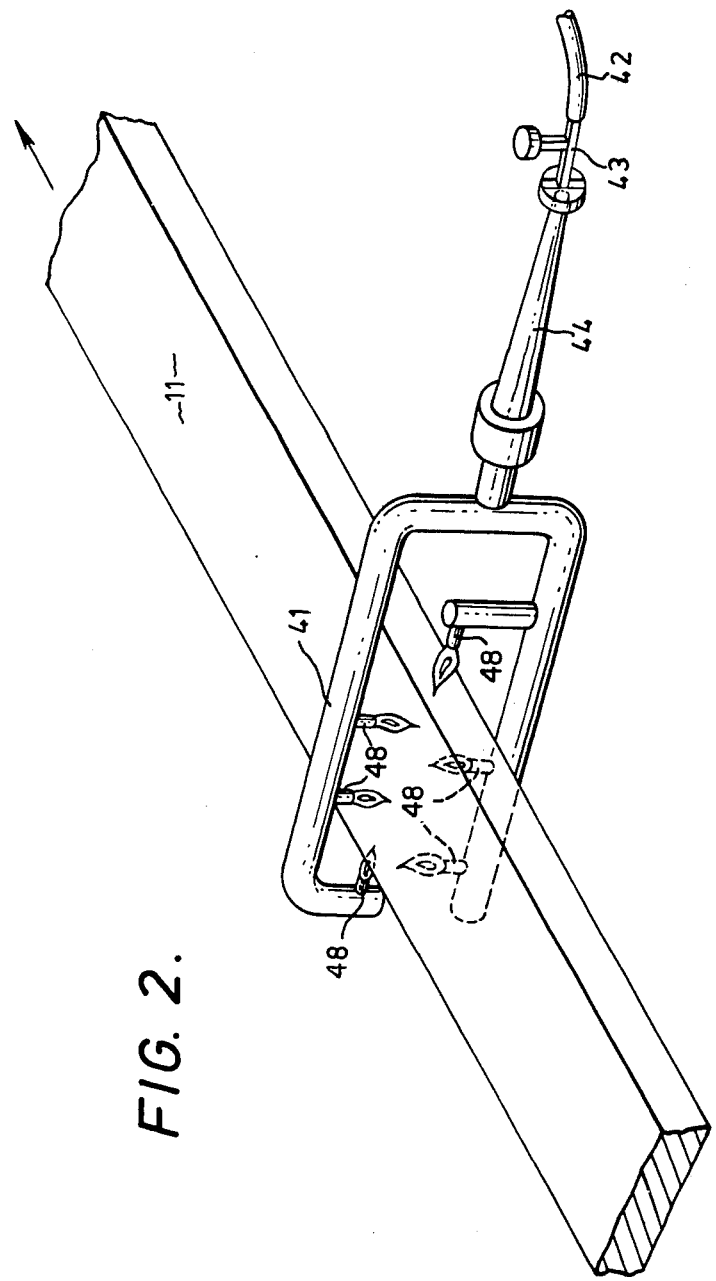
FIG. 2 shows a view in perspective of a felt crisping section forming part of the apparatus of FIGS. 1A and 1B.

The crisping unit 28 is illustrated in great detail in FIG. 2 and has six gas burner nozzles 48 which are connected to a common gas supply manifold 41. A gas supply pipe 42, which is connected to a source of inflammable gas (not shown), supplies the gas through an on-off cock 43 and a connecting pipe 44 to the gas supply manifold 41. As can be seen from FIG. 2, the gas burner nozzles 40 are so arranged that two of them direct their flames to the upper surface of the felt 11, two of the undersurface of the felt 11, and the remaining two to the respective opposite edges of the felt 11.

Figure 3:
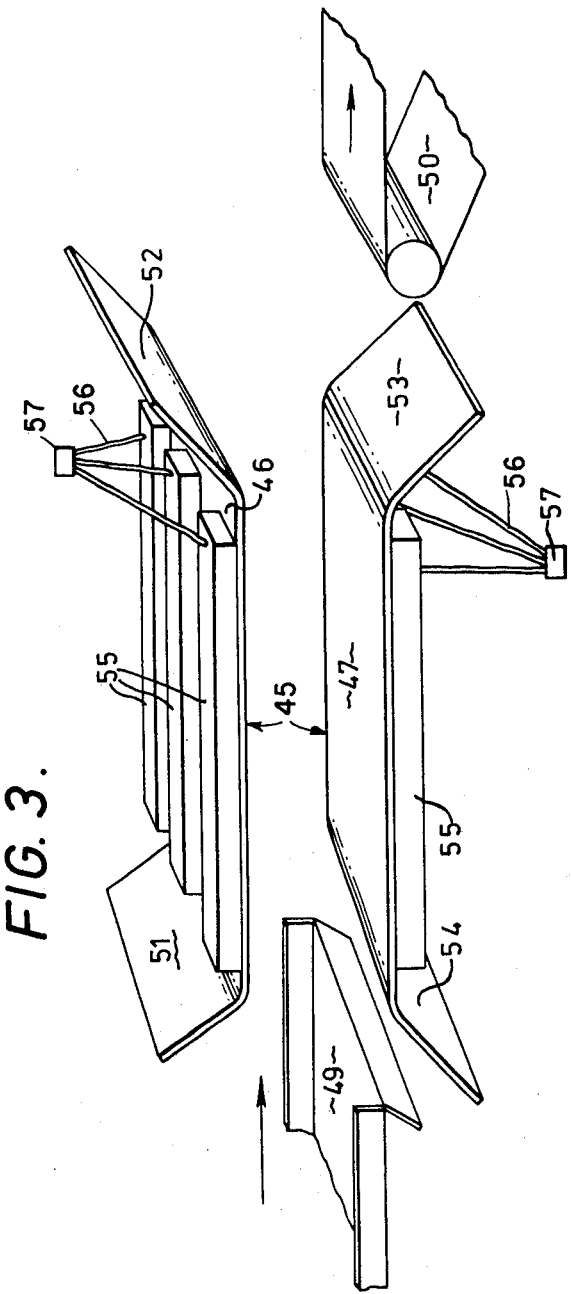
FIG. 3 shows a view in perspective of an alternative form of crisping section for use in the apparatus of FIGS. 1A and 1B.

Instead of the gas burner type of crisping unit 28 illustrated in FIG. 2, an electrically heated crisping unit illustrated in FIG. 3 and indicated generally by reference numeral 45 may be employed.

The electrically heated crisping unit 45 has an upper heater plate 46 and a lower heater plate 47, which are vertically spaced apart to allow the felt 11 to pass between them. The lower heater plate 47 is disposed in a gap between a stationary guide channel 49, along which the felt 11 slides towards the crisping unit 45, and a conveyor belt 50 for conveying the felt 11 beyond the crisping unit 45.

The upper and lower heater plates 46 and 47 are bent at the opposite ends thereof to form inclined end portions 51, 54 extending away from the path of the felt 11 to facilitate travel of the felt 11 between the heater plates 46 and 47.

The upper heater plate 46 is vertically adjustable by means of an adjustment mechanism, which is not illustrated in the drawings, to enable the crisping unit 45 to be adapted to different thicknesses of felt.

At the upper side of the upper heater plate 46, and the underside of the lower heater plate 47, there are provided heater blocks 55 containing electrical resistance heater elements (not shown) which can be connected by connection leads 56 to connecting plugs 57 for connection to a current supply network.

In use, the upper and lower heater plates 46 and 47 are heated by the heater blocks 55 and contact opposite surfaces of the felt 11 as the latter moves from the guide channel 49 to the conveyor belt 50, thereby at least partly curing the hardenable bonding material at and adjacent those surfaces of the felt.

Referring now to FIGS. 4 to 7 of the accompanying drawings; the forming unit 30 is provided with a casing having a cylindrical inlet portion 60, a cylindrical outlet portion 61 and a cylindrical intermediate portion 62 extending between and connecting the inlet and outlet portion 60 and 61.

Figure 4:
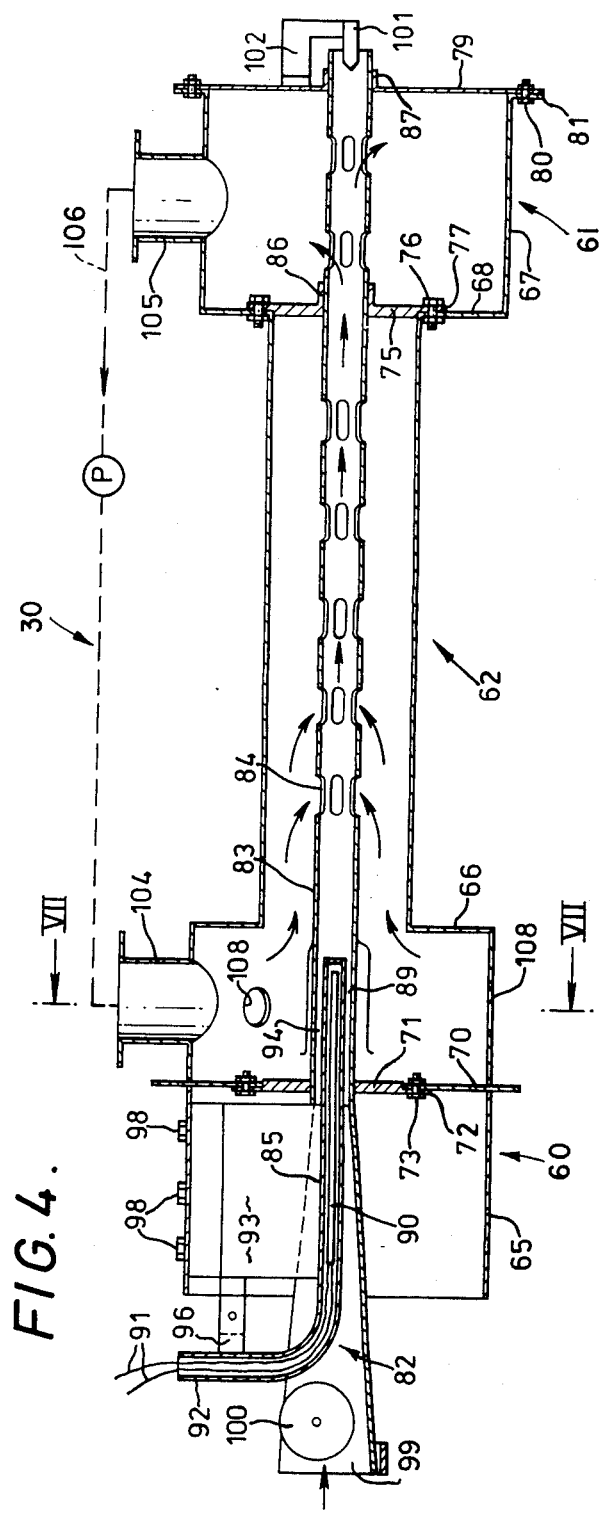
FIG. 4 shows a view taken in longitudinal cross-section through a forming section which is part of the apparatus shown in FIGS. 1A and 1B.

The inlet portion 60 of the casing has a cylindrical wall 65 which is open at its left-hand end, as viewed in FIG. 4, and which at its opposite end is connected to a radially-inwardly extending annular wall 66. The outlet portion 61 of the casing has a cylindrical wall 67 connected at its left-hand end, as viewed in FIG. 4, to a radially-inwardly extending flat annular wall 68, and the cylindrical intermediate portion 62 of the casing extends between and is connected to the inner peripheries of the annular walls 66 and 68.

The cylindrical wall 65 of the inlet portion 60 of the casing is provided with a transverse partition wall 70 formed with a central circular opening into which fits a circular support plate 71. The circular support plate 71 is formed with a peripheral flange 72 which is connected by bolts 73 to the partition wall 70.

A further circular support plate 75 is provided at the right-hand end of the intermediate portions 62, as viewed in FIG. 4, by bolts 76 co-operating with a flange 77 on the circular support plate 75 and with the flat annular wall 68 of the casing outlet portion 61.

A circular plate 79 is secured by bolts 80 to a radially-outwardly extending flange 81 at the outlet end of the casing outlet portion 61.

Although not shown in the drawings, the bolts 73, 76 and 80 may be replaced by quick-acting toggle clamps enabling the support plates 71, 75 and 79 to be readily secured in position or released therefrom.

An outer die 83 extends co-axially with the casing inlet outlet and intermediate portions 60, 61 and 62 and through circular openings in the support plates 71, 75 and 79. The outer die 83 is in the form of a cylindrical pipe perforated by a number of longitudinally extending openings 84 which are distributed longitudinally and circumferentially of the outer die 83 and the purpose of which is explained below.

Figure 6:
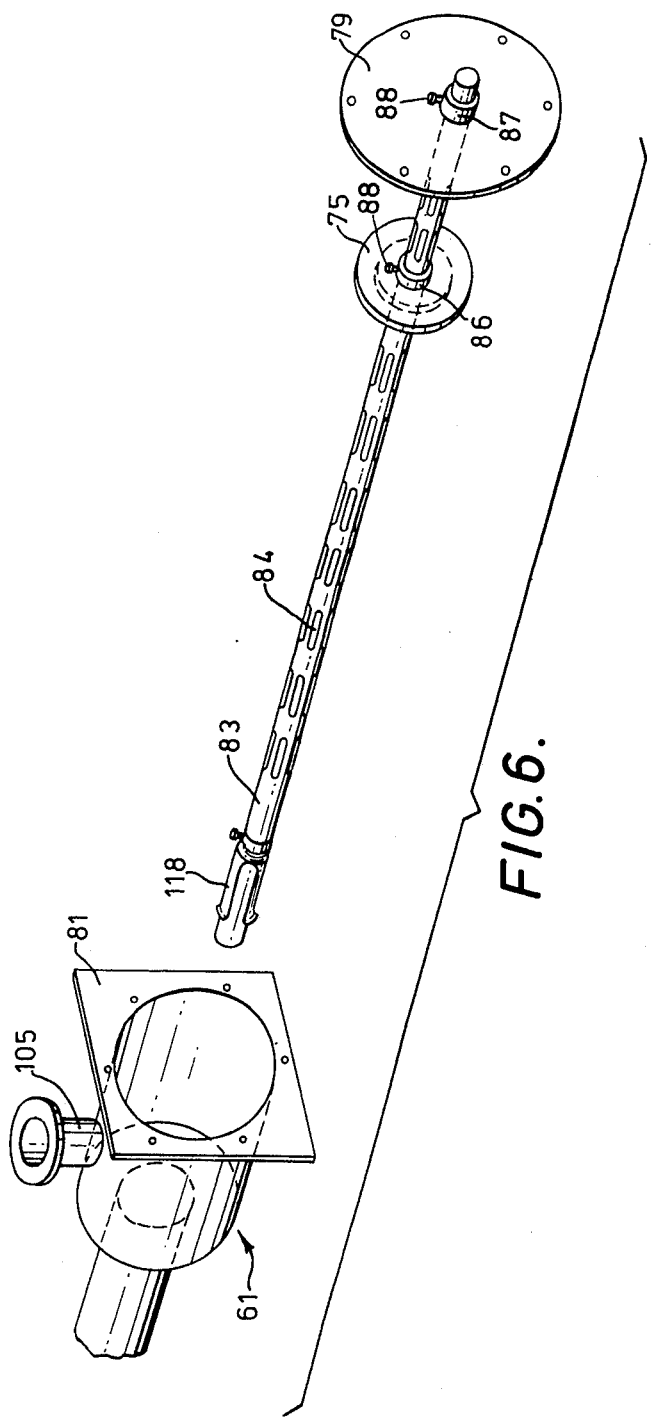
FIG. 6 shows a view in perspective of other parts of the forming section of FIG. 4 separated from one another.

The support plates 75 and 79, as can be best seen from FIG. 6, are provided with longitudinally split sleeves 86 and 87 which fit around the outer surface of the outer die 83. Circular worm screw clamps 88 compress these sleeves 86 and 87 to give a friction grip on the outer surface of the outer die 83, thus securing the support plates 75 and 79 to the outer die 83.

The left-hand end of the outer die 83 is slid into, but not secured to, the support plate 71, so that on release of the bolts 76 and 80, the outer die 83 and therewith the support plates 75 and 79 can readily be withdrawn as a unit from the casing portions 60, 61 and 62.

An inner die 82 is provided at the inlet end of the outer die 83 and is in the form of a pipe bent to provide an axial pipe portion 85 extending axially into the casing inlet portion 60 and into the inlet end of the outer die 83, and an upwardly extending pipe portion 92. The outer surface of the axial pipe portion 85 is radially spaced from the inner surface of the outer die 83 to provide an annular gap 89 for passage of the felt 11 between the axial pipe portion 85 and the outer die 83. An electrical resistance heater 90 for heating and curing the felt 11 as it passes through the gap 89 is provided within the axial pipe portion 85 and connected to supply leads 91 which extend through the vertical pipe portion 92 for connection to a source of electrical current (not shown).

Figure 5:
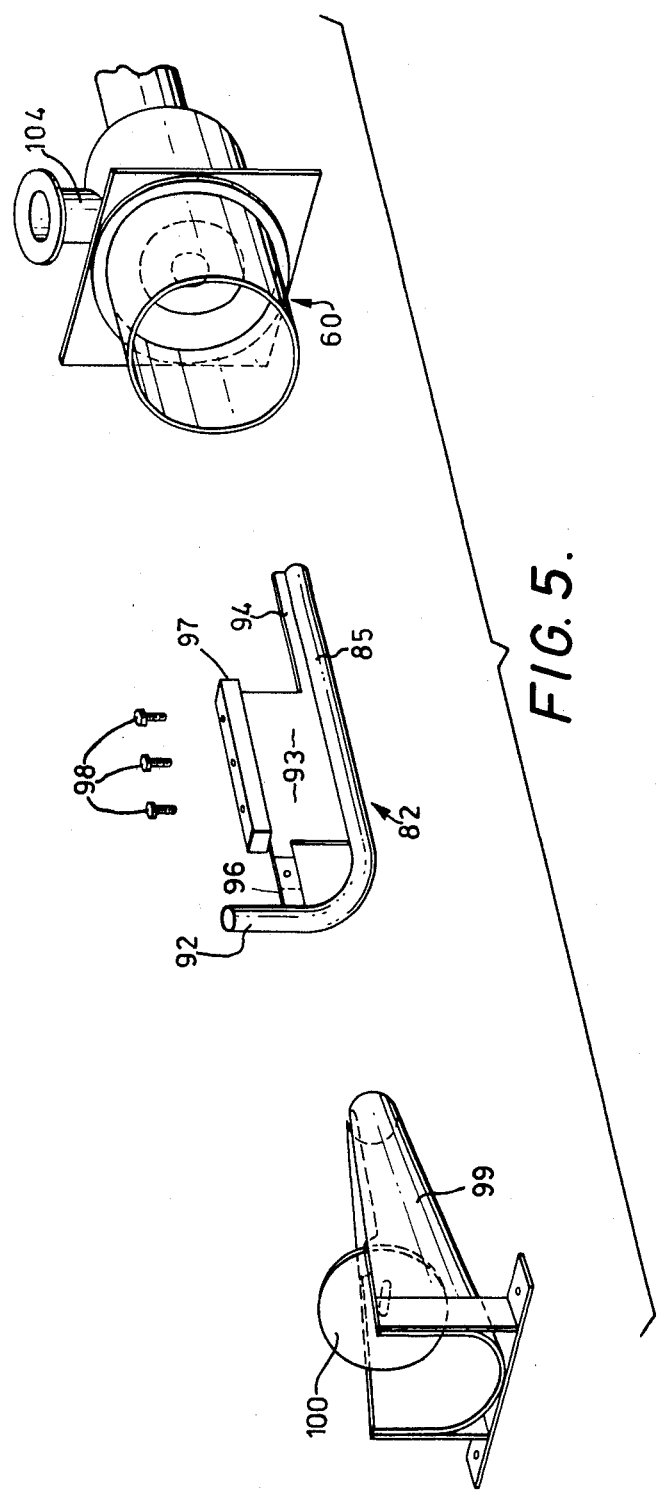
FIG. 5 shows a view in perspective of parts of the forming section of FIG. 4 separated from one another.

A flat vertical heater plate 93 having an extension 94 of lesser height than the main portion of the heater plate 93 is provided at the top of the axial pipe portion 85 in heat conducting contact therewith, and to provide greater rigidity the vertical pipe portion 92 is connected by a support bracket 96 to the heating plate 93. The extension 94 extends between the outer die 83 and the axial pipe portion 85 across the gap 89. A support block 97 shown in FIG. 5 is fixed to the top of the heater plate 93, and three bolts 98, or quick release clamps (not shown), extending through the top of the casing inlet portion 60 support the block 97, and therewith the heater plate 93 and the inner die 82, in position in the casing inlet portion 60.

For guiding the felt 11 into the forming section, and more particularly for progressively converting the cross-section of the felt 11 from a trapezoidal shape to a substantially annular shape as the felt advances to the annular gap 89, a guide channel 95 shown in FIG. 1B having a transverse cross-section which is flat at its inlet end and which is progressively increasingly curved towards its outlet end has its outlet end connected to a die entry cone 99, which extends through the open inlet end of the casing inlet portion 60 to the inlet end of the outer die 83. A wheel 100 is mounted in the inlet cone 99 and is freely rotatable about an axis transverse to the length of the inlet cone 99, the purpose of the wheel 100 being to engage the upper surface of the felt as the felt passes through the inlet cone 99 and thereby facilitate the deformation of the cross-section of the felt.

At the outlet end of the forming section, a plug 101 co-axial with the outer die 83 extends partly into the outlet end of the outer die 83 for preventing the escape of heated gas from the interior of the hollow cylindrically-deformed felt, as described below, the plug 101 being radially spaced from the outer die 83 to allow passage of the felt therebetween. A bracket 102 of the sheet metal secured to the support plate 79 supports the plug 101 in position.

The inlet casing portion 60 is provided with a gas inlet pipe 104, and the casing outlet portion 61 is provided with a gas outlet pipe 105, and a pump P is provided for recycling hot gases through a pipeline indicated diagrammatically by broken line 106 from the outlet pipe 105 to the inlet pipe, as described in greater detail below.

Figure 7:
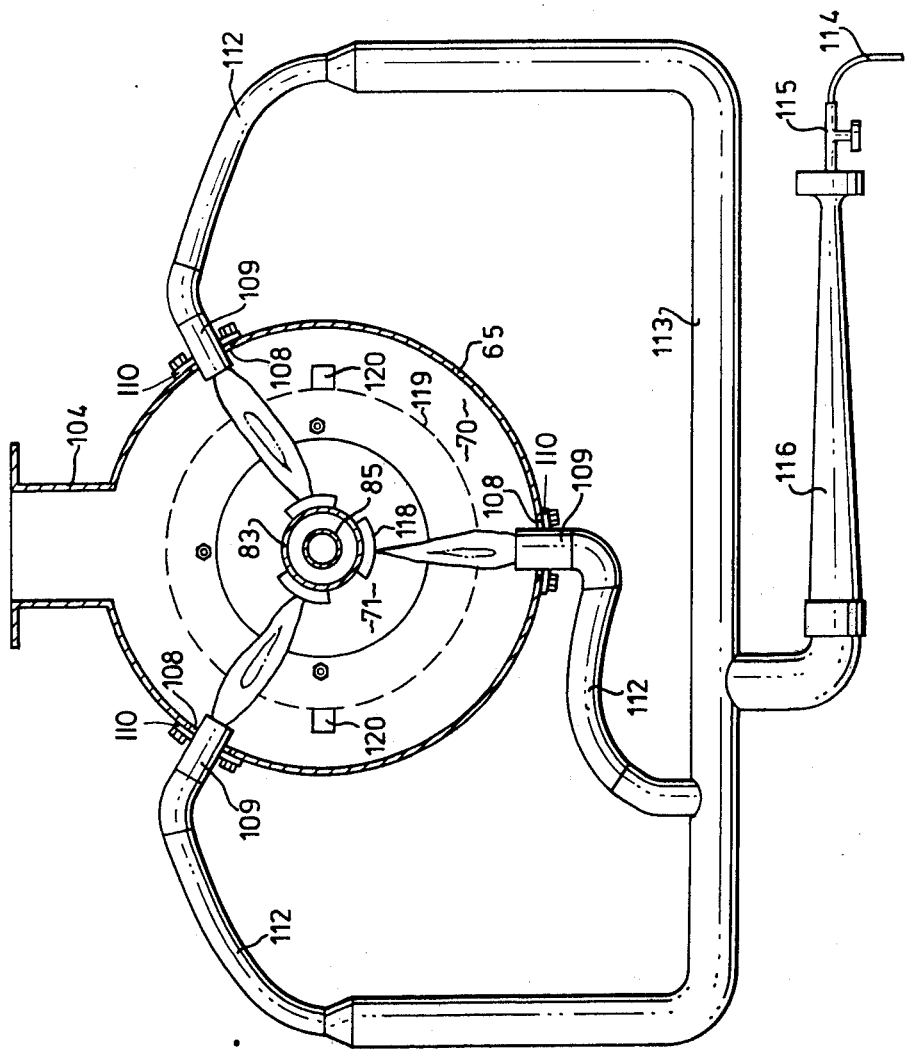
FIG. 7 shows a view taken in transverse cross-section through the forming section along the line VII-VII of FIG. 4.

FIG. 7 shows a view in transverse cross-section taken along the line VII–VII of FIG. 4 to illustrate a gas burner arrangement which is provided for curing the felt 11 as the latter passes through the casing inlet portion 60, and parts of which have been omitted from FIG. 4 in order to clarify the illustration of the forming section.

As can be seen from FIG. 7, the cylindrical wall 65 is formed with three equiangularly spaced openings 108, and three gas burner nozzles 109 extend radially through the openings 108. Each gas burner nozzle 109 is supported in position by a flange 110 seated on the external surface of the cylindrical wall 65 and bolted to the latter.

The gas burner nozzles 109 are connected by flexible connecting pipes 112 to respective arms of a gas supply manifold 113. A gas supply pipe 114, extending from a source of inflammable gas (not shown), is connected through an on-off cock 115 and a connecting pipe 116 to the gas supply manifold 113 to provide a supply of gas from the gas source to the gas burner nozzles.

The outer die 83 is provided with three flame blast guards 118 for the flames of the gas burner nozzles 109, and as a further safety precaution a perforated blast guard 119 extends around the outer die 83 at a spacing therefrom, the perforated blast guard 119 being formed with three openings for the three flames of the gas burner nozzles 109, and being supported from the partition wall 70 by support brackets 120.

The gripper mechanism, which serves as a felt feed mechanism for pulling the felt through the forming section, is illustrated in FIGS. 8 and 9 and has a base 130 and a top 131 supported above the base 130 on eight uprights 132. Upper and lower drive shafts 133, 134, 135 and 136 are rotatably supported by the uprights 132 and carry rectangular upper and lower frames 139, 140, which in turn respectively support upper and lower endless gripper conveyors 141, 142 extending parallel to the path of the tube 31 at opposite sides thereof.

Each of the gripper conveyors 141, 142 is provided with a plurality of gripper plates 143, each of which is formed with a V-shaped recess 144 for gripping contact with the periphery of the tube 31 or with tubes of different outer diameters from that of the tube 31.

four further shafts 138 are freely rotatably supported by the uprights 132 and provided with crank arms 145 for manual rotation of the shafts 138. The shafts 138 carry bevel gears 146, which mesh with bevel gears 147 provided on vertical shafts 148. The shafts 133 to 136 are rotatable in bearings 149 which are in threaded engagement with and carried by worm threads on the vertical shafts 148. Thus, by rotation of the crank arms 145 and consequential rotation of the vertical shafts 148, the shafts 133 to 136 can be vertically displaceably adjusted to enable the vertical spacing between the support frames 139 and 140, and consequently between the gripper conveyors 141 and 142, to be adjusted to adapt the gripper mechanism for operation with tubes of different outer diameters.

The endless conveyors 141, 142 are driven by an electric motor 150 through sprockets 151, 152 and 153 and a drive chain 154. The sprockets 152 and 153 are provided on the lower ends of respective vertical drive shafts 156 and 157, which are drivingly connected to the shafts 134 and 133, respectively, through bevel gears 158 and 159. The bevel gears 158 are slidable along the vertical drive shafts 156 and 157 and connected by brackets 129 to the shafts 133, 134 so as to remain in mesh with the bevel gears 159 on vertical adjustment of the shafts 133 and 134.

The shafts 133 and 134 are drivingly connected, in turn, by sprockets 160 and 161 and drive chains 162 and 163 to a pair of sprockets 164 which are fixedly secured to shafts 165 and 166. The gripper conveyors 141 and 142 extend around sprockets 167 and 168 fixed to the shafts 165 and 166, respectively, and around sprockets 169 and 170, which are fixed to shafts 171 and 172, respectively. The shafts 165, 166, 171 and 172 are freely rotatably secured to the support frames 139 and 140.

The support frames 139 and 140 are releasably secured to the upper and lower shafts 135 and 136 to allow pivotation of the upper and lower support frames 139 and 140 about the axis of the shafts 133 and 134 into the positions shown in broken lines in FIG. 8 and indicated by reference numerals 139A and 140A to facilitate initial insertion of the tube 31 through the gripper mechanism and to provide access to the forming section 30 through the gripper mechanism 33.

The operation of the above-described apparatus is as follows:

The uncured felt 11 is fed from the supply coil 10 towards the freely rotatable support rollers 17 and before the felt 11 reaches the first of the rollers 17, the paper strip 13 is stripped from the undersurface of the felt by the stripper 15. As it passes over the rollers 17, the felt 11 is cut to the required width by the circular cutter 14, and any superfluous felt is wound up on the take-up coil 16. When the supply coil 10 has been exhausted, the take-up coil 16. When the supply coil 10 has been exhausted, the take-up coil 16 may be transferred from the position from which it is shown in FIG. 1A to the freely rotatable support rollers 12 for passage through the apparatus. Alternatively, if the cutter 14 cuts the original felt strip into two strips of equal width suitable for processing by the apparatus, then when the coil 10 has been exhausted the take-up coil 16 may be moved to the position 16A, shown in broken lines in FIG. 1A, and the strip on take-up coil 16 may then be processed through the apparatus.

Thus, by means of the cutter 14, the felt 11 is cut from the width shown in FIG. 10A to the width shown in FIG. 10B.

At the compaction rollers 19, 20, the felt 11 is both compacted and given a trapezoidal cross-section as shown in FIG. 10C. The purpose of this compaction is to increase the tensile strength of the felt 11 before the latter passes through the forming section 30 and thus to counteract the above-mentioned non-uniformly low strength under tension of the felt.

At the reinforcement feed section 21, the reinforcement cord 23, or any other suitable reinforcing tensile member such as yarn, rope, scrim, cloth or woven roving, is supplied from the supply reel 22 through the bath container 24, where it is supplied with a liquid binder, to the underside of the felt 11. The purpose of this reinforcement cord or other tensile member is to supplement the tensile strength of the felt.

The felt then passes through the crisping section 28 (or the modified crisping section described above with reference to FIG. 3) at which, as described above, the bonding material at and adjacent the outer surfaces of the felt 11 is at least partly cured while the bulk of the bonding material remains uncured. This partial curing of the bonding material both reduces the tackiness of the felt at its surfaces, thus reducing frictional drag on the felt as it passes through the forming section, and also further increases the tensile strength of the felt.

In addition to the modification of the crisping unit described in reference to FIG. 3, further modifications are possible. For example, when employing gas burner nozzles, the nozzles may be shaped to produce relatively thin flames so that the bonding material is cured only along strips extending longitudinally of the felt, or the burner nozzles may be shaped to produce fan-shaped flames covering the whole of the surface of the felt. A further possibility is to employ a perforated or wire mesh drum which is heated and which is rotated in contact with a surface of the felt so as to leave uncured areas on the felt surface. However, it has been found in practice preferable to cure the whole of the upper and under surfaces of the felt 11, although it has been found to be detrimental to cure the bonding material in depth within the felt since that results in greater resistance to transverse deformation of the felt in the forming section.

From the crisping unit 28, the felt passes along the guide channel 95, by which the cross-section of the felt is gradually deformed from the flat trapezoidal shape shown in FIG. 10C to a semi-circularly shaped cross-section as shown in FIG. 10D. This deformation of the cross-section of the felt is continued by the inlet cone 99 so that as the felt enters the inlet end of the outer die 83 it has a substantially closed cross-section as shown in FIG. 10E.

Before reaching the inlet end of the outer die 83, the felt is wrapped by the inlet cone 99 around the axial pipe portion 85 of the inner die 82 and heated thereby.

Simultaneously, the edges of the felt 11 slide along the heater plate 93, and subsequently along the extension 94 of the heater plate 93, and are thereby heated by heat conducted from the inner die 82 to the heater plate 93 and the extension plate 94. This heating of the felt increases the curing of the bonding material begun by the crisping unit 28.

As the felt passes through the inlet end of the outer die 83, it is further heated by the flames of the gas burner nozzles 109.

If the thickness of the felt is sufficiently small, the heating so far effected may be sufficient to complete the curing of the bonding material throughout the thickness of the felt. However, for thicker felts, further heating is required. For this purpose, the hot gases from the flames of the burner nozzles 109 travel along the casing intermediate portion 62 and pass through the openings 84 in the outer die 83 and through the felt, which by now has been formed into the longitudinally split cylindrical tube 31. The plug 101 prevents the hot gases from flowing from the interior of the tube 31 to the surrounding atmosphere, the support bracket 102 being accommodated by the longitudinal slot formed in the tube by the heater plate 93. The pump P creates a suction in the casing outlet portion 61 to draw the hot gases radially outwardly from the tube 31 through the outer die 83 and the gas outlet pipe 105, these hot gases then being recirculated into the casing inlet portion 60 through the gas inlet pipe 104.

The flow of the gases in a radially inward direction through the openings 84 of the outer die 83 tends to move or "float" the felt away from the inner surface of the outer die 83 and thus reduces the frictional drag on the felt as the felt moves through the forming section. The suction produced in the interior of the casing outlet portion 61 by the pump P helps to remove fumes from the felt, thus reducing build-up of condensed fumes on the inner and outer dies, and in addition prevents these fumes from escaping to the ambient atmosphere, so that operation of the apparatus is very clean and acceptable to the operating personnel. Moreover, this suction causes air from the ambient atmosphere to be drawn into the casing through the felt between the plug 101 and the outer die 83, and this flow of fresh air through the felt automatically cools and de-fumes the felt as the latter leaves the forming section. Any condensation of binder solids and dust from the felt which accumulate in the casing outlet portion 61 may be readily removed when the forming section is periodically cleaned.

The movement of the felt through the forming section is assisted by the pull exerted on the tube 31 by the gripper mechanism 33, which of course engages the tube after the tensile strength of the felt has been substantially increased by the curing of the felt in the forming section 30. This pull produces a tension in the tube 31 and thus in the felt, which facilitates the advance of the felt through the forming section 30 by overcoming frictional resistance between the felt and the die surfaces. Moreover, it has been found that this tension can be arranged to produce the effect of reducing the size of the cross-section of the felt in the forming section 30 and thus of reducing friction at the inner surface of the outer die 83. This tension is transmitted through the forming section 30 to the portion of the felt travelling towards the forming section and indeed as far as the supply coil 10. In this way, the pulling of the felt by gripper mechanism 33 causes the felt to advance towards and through the forming section 30 and, while the advance of the felt to the forming section 30 is assisted by a conveyor (not shown), the pulling by the gripper mechanism 33 causes the felt to travel at a slightly higher speed than the conveyor and thus subjects the felt to a "drawing" action to prevent humping and jamming of the felt.

After the gripper mechanism 33, the tube passes the cutter 35 which cuts a kerf 180 in the inner surface of the tube 31 opposite the longitudinal slit thereof as shown in FIG. 10F.

After having been cut into sections of the required length by the transverse cutter 38, the cut lengths are collected and passed through the automatic wrapping machine 39, which provides each tube section with an overwrap 181 (FIG. 11), after which the tube sections, which are now finished one-piece pipe insulation sections, pass to the automatic boxing machine 40 where they are packed for storage and transportation.

It is to be understood that the above description of the felt forming apparatus illustrated in the accompanying drawings is given by way of example and not limitation, and that various modifications may be effected therein within the scope of the present invention. For example, instead of employing a strip of paper 13 to prevent the successive layers of the felt from adhering to one another in the supply coil 10, the paper 13 may be replaced by a woven fabric which may be left on the felt during the passage of the felt through the apparatus and subsequently, in this case, the woven fabric may serve to supplement the tensile strength of the uncured felt, instead of the reinforcement cord 23 or other tensile member, and the reinforcement feed section 21 may be omitted.

In addition, the above-described apparatus may be readily adapted for the manufacture of one-piece insulation sections of different internal and/or external diameters, or indeed of articles having cross-sections other than substantially annular cross-sections. For this purpose, the forming section 30 has been designed so that the inner and outer dies 82 and 83 can be readily removed from the forming section 30 and replaced therein by other dies of different diameter and, if required, of different cross-sectional shape. For this purpose, it is simply necessary to release the bolts 73, 76 and 80, or the quick acting toggle clamps, and to release the inlet cone 99, whereupon these parts can be removed from the casing of the forming section 30 as illustrated in FIGS. 5 and 6. This ready replacement of the dies is particularly important in the manufacture of one-piece pipe insulation sections, which are often required to be produced in a range of different sizes. While the use of a crisping section and a tensile member bonded to the felt for increasing and supplementing the tensile strength of the felt before the felt reaches the forming section have been described above, other means may be employed for this purpose. For example, a stitching mechanism may be provided for forming a longitudinal row of reinforcing stitches along the felt.

I claim:

1. A method of forming articles from a strip-shaped felt of fibrous material containing heat-hardenable bonding material, comprising the steps of:
   supplying the felt longitudinally towards forming surfaces which are spaced apart for receiving the felt therebetween;
   pulling the felt longitudinally between said spaced forming surfaces so that said spaced forming surfaces mold the cross-sectional shape of the felt by sliding contact with opposite sides of the felt;
   flowing hot gas into one side of the felt, through the entire thickness of the felt and out from the opposite side of the felt to cure the bonding material;
   the pulling of the felt being effected by gripping the molded and cured felt; and
   cutting the molded and cured felt into predetermined lengths.

2. A method of forming articles from a strip-shaped felt of fibrous material containing heat-hardenable bonding material, comprising the steps of:
   supplying the felt longitudinally towards a pair of stationary forming surfaces which are spaced apart for receiving the felt therebetween, one of said forming surfaces being provided on an inner die and the other of said forming surfaces extending around said inner die with a gap therebetween;
   progressively altering the transverse shape of the felt by guiding the felt in direct sliding contact along a guide surface having a transverse shape which varies along the length of said guide surface;
   said guide surface causing the felt to wrap around said inner die as said felt approaches said gap between said forming surfaces;
   pulling the felt between said spaced forming surfaces so that said forming surfaces mold the cross-sectional shape of the felt by sliding contact with opposite sides of the felt;
   flowing hot gas, at a position beyond said inner die, into one side of the felt, through the entire thickness of the felt and out from the other side of the felt to cure the bonding material;
   the pulling of the felt being effected by gripping the molded and cured felt; and
   cutting the molded and cured felt into predetermined lengths.

3. A method of forming articles from a strip-shaped felt of fibrous material containing heat-hardenable bonding material, comprising the steps of:

supplying the felt longitudinally towards forming surfaces which are spaced apart for receiving the felt in a gap therebetween;

progressively altering the cross-sectional shape of the felt by direct sliding contact of the felt along a stationary guide surface before the felt passes between the stationary forming surfaces, said stationary guide surface having a cross-sectional shape which varies along the length thereof for adapting the cross-sectional shape of the felt to the shape of the gap;

pulling the felt longitudinally between said spaced forming surfaces so that said spaced forming surfaces mold the cross-sectional shape of the felt by sliding contact with opposite side of the felt;

flowing hot gas through the felt to cure the bonding material;

the pulling of the felt being effected by gripping the molded and cured felt; and cutting the molded and cured felt into predetermined lengths.

4. A method as claimed in claim 3, said forming surfaces comprising an inner die forming surface and an outer die forming surface extending around said inner forming surface with a gap between said inner and outer forming surfaces, further comprising the step of wrapping the felt around said inner die forming surface as the felt advances through the gap.

5. A method of forming articles from a strip-shaped felt of fibrous material containing heat-hardenable bonding material, comprising the steps of:

supplying the felt longitudinally towards forming surfaces which are spaced apart for receiving the felt therebetween and comprise an inner forming die and an outer forming die extending around the inner forming die with a gap between said inner and outer forming dies;

progressively altering the cross-sectional shape of the felt during the advance of the felt towards said forming surfaces to wrap the felt around said inner die;

pulling the felt longitudinally through the gap between said spaced forming surfaces so that said spaced forming surfaces mold the cross-sectional shape of the felt by sliding contact with opposite side of the felt;

flowing hot gas into one side of the felt, through the entire thickness of the felt and out from the opposite side of the felt beyond said main forming die to cure the bonding material;

the pulling of the felt being effected by gripping the molded and cured felt; and cutting the molded and curved felt into predetermined lengths.

6. A method as claimed in claim 5, wherein said pulling of said felt is effected by gripping said felt beyond a position at which said bonding material is cured.

7. A method as claimed in claim 5, which includes partly curing said bonding material before said felt reaches said forming surfaces.

8. A method as claimed in claim 7, wherein only a region of said binder at and adjacent the surface of said felt is cured before said felt reaches said forming surfaces.

9. A method as claimed in claim 5, which includes compacting said felt before said felt reaches said forming surfaces.

10. A method as claimed in claim 5, which includes stitching said felt before said felt reaches said forming surfaces.

11. A method as claimed in claim 5, wherein said deforming of the cross-section of said felt comprises forming said felt into a longitudinally split tube.

12. A method as claimed in claim 5, which includes heating at least one of said forming surfaces to partly cure said bonding material.

13. A method as claimed in claim 5, which includes reinforcing said felt by providing at least one tensile member which passes between said forming surfaces with said felt and is permanently united with said felt.

14. A method as claimed in claim 5, which includes preforming said felt, before said felt reaches the forming surfaces, to facilitate passage of said felt between said forming surfaces.

15. A method as claimed in claim 5, which includes forming a slot extending partly through the thickness of said felt.

16. A method as claimed in claim 5, which includes compacting said felt and curing said bonding material at and adjacent the surface of said felt before said felt reaches the forming surfaces, feeding at least one tensile member with the felt between said forming surfaces, forming said felt into a longitudinally split tube by means of said forming surfaces, heating said forming surfaces to partly cure said bonding material, cutting a longitudinal slot through part of the thickness of said felt and completing the curing by curing the remaining uncured bonding material while said felt is in its deformed state.

17. A method as claimed in claim 16, wherein the curing of said felt includes passing hot gases through said felt from openings in one of said forming surfaces.

18. A method as claimed in claim 16, wherein one of said forming surfaces is the internal surface of a cylindrical die through which said felt is moved, and hot gases are passed through said felt from openings in said internal surface to cure said felt.

19. A method as claimed in claim 18, which includes drawing the hot gases outwardly from said felt through further openings in said cylindrical member.

20. A method as claimed in claim 19, which includes drawing air through said felt subsequent to the curing of said felt to cool and defume said felt.

21. A method as claimed in claim 5, wherein the pulling of said felt is effected by gripping said felt at a position beyond that at which the hot gases flow through said felt.

22. A method as claimed in claim 5, wherein the pulling of said felt contracts the cross-section of said felt to reduce friction between said felt and said forming surfaces.

23. A method as claimed in claim 2, wherein the pulling of said felt contracts the cross-section of said felt to reduce friction between said felt and said forming surfaces.

* * * * *